(12) United States Patent
Namiki et al.

(10) Patent No.: US 10,312,642 B2
(45) Date of Patent: Jun. 4, 2019

(54) PROTECTOR AND WIRE HARNESS

(71) Applicant: Yazaki Corporation, Tokyo (JP)

(72) Inventors: Shintaro Namiki, Shizuoka (JP); Satoshi Uematsu, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 15/874,826

(22) Filed: Jan. 18, 2018

(65) Prior Publication Data

US 2018/0212374 A1  Jul. 26, 2018

(30) Foreign Application Priority Data

Jan. 25, 2017  (JP) ................. 2017-011416

(51) Int. Cl.
*H02G 3/04* (2006.01)
*B60R 16/02* (2006.01)
*H01R 13/60* (2006.01)
*H01R 13/74* (2006.01)

(52) U.S. Cl.
CPC ......... *H01R 13/74* (2013.01); *B60R 16/0215* (2013.01); *H02G 3/04* (2013.01); *H01R 13/60* (2013.01)

(58) Field of Classification Search
CPC ........ H01R 13/60; H01R 13/72; H01R 13/74; F16L 3/00; F16L 3/01; F16L 3/02; F16L 3/08; H02G 3/04; B60R 16/0215
USPC ............... 439/528; 248/68.1; 174/69–93
See application file for complete search history.

(56) References Cited

U.S. PATENT DOCUMENTS

| 5,556,059 | A |   | 9/1996 | Maeda et al. |   |
|---|---|---|---|---|---|
| 5,615,080 | A | * | 3/1997 | Nishitani | B60R 16/0215 307/10.1 |
| 5,630,728 | A | * | 5/1997 | Watters, Jr. | H01R 13/60 439/528 |
| 5,856,908 | A | * | 1/1999 | Takiguchi | B60R 16/0215 174/72 A |
| 2015/0294768 | A1 | * | 10/2015 | Sakaki | B60R 16/0207 174/68.3 |

FOREIGN PATENT DOCUMENTS

JP   7-69141 A   3/1995

\* cited by examiner

*Primary Examiner* — Gary F Paumen
(74) *Attorney, Agent, or Firm* — Kenealy Vaidya LLP

(57) ABSTRACT

A protector includes a main unit having an inside in which wires W are wired and a connector holder. The connector holder removably holds a female connector that is exposed to the outside of the main unit from a wiring opening formed in the main unit. The connector holder includes an insertion opening in which the connector is inserted and a housing space that houses and holds the connector inserted from the insertion opening. The insertion opening is formed to be exposed to the outside of the main unit.

10 Claims, 6 Drawing Sheets

PROTECTOR AND WIRE HARNESS

CROSS-REFERENCE TO RELATED APPLICATION(S)

The present application claims priority to and incorporates by reference the entire contents of Japanese Patent Application No. 2017-011416 filed in Japan on Jan. 25, 2017.

BACKGROUND OF THE INVENTION

1. Field of the Invention

The present invention relates to a protector and a wire harness.

2. Description of the Related Art

A steering wheel in a vehicle has various switches for driving various electronic devices mounted in the vehicle. For example, a driver operates a switch associated with an electronic device having a desired function. This enables the driver to drive the specific electronic device. The switch and the electronic device associated therewith are electrically connected by a wire. The above-described vehicle includes such wires in plurality. Thus, a protector is installed in the vehicle for protecting the wires by grouping together and wiring the wires inside.

Some vehicles allow the above function to be retrofitted. With the vehicle that allows the function to be retrofitted, the corresponding electronic device and switch are retrofitted on the vehicle and electrically connected by wires. Wires wired inside a protector are mounted in advance in the vehicle. The wires have first ends to which female connectors for electrically connecting the retrofitted electronic device and the switch are attached.

The female connector is to be connected with a male connector that is attached to the electronic device retrofitted for use. This necessity requires the female connector to be exposed to the outside of the protector. It is therefore desired to hold the female connector that is yet to be connected with the male connector, specifically, the female connector not in use in order to protect the female connector from, for example, vibrations of the vehicle during traveling.

One possible method for integrally holding the female connector and the protector is to bring the female connector into tight contact with an outer periphery of the protector and to wind adhesive tape from the outer peripheral side of the female connector and the protector, thereby fixing the female connector and the protector. Unfortunately, however, the method for holding using the adhesive tape requires an operator to remove the adhesive tape wound around the female connector and the protector in order to release the holding of the female connector onto the protector to connect the female connector with the male connector. Thus, workability still needs improvement.

SUMMARY OF THE INVENTION

The present invention has been made in view of the foregoing situation and it is an object of the present invention to provide a protector and a wire harness capable of improving workability during holding of a connector and releasing of the holding of the connector.

In order to achieve the above mentioned object, a protector according to one aspect of the present invention includes a main unit inside which a plurality of flexible wiring members are wired; and a connector holder that removably holds a connector that is electrically connected with an end of at least one wiring member out of the wiring members and is exposed to an outside of the main unit from a wiring opening formed in the main unit, wherein the connector is to be fitted into a counterpart connector in a mutual relation, the connector holder has an insertion opening in which the connector is to be inserted from the outside and a housing space that houses and holds the connector, and the insertion opening is formed to be exposed to the outside of the main unit.

According to another aspect of the present invention, in the protector, it is possible to configure that the connector holder includes: a holder main unit in which the housing space is defined; and a holder-side lock formed on at least one inner lateral surface out of inner lateral surfaces constituting the housing space in the holder main unit, under a condition in which the connector is housed in the housing space, the holder-side lock faces a connector-side lock formed on an outer peripheral surface of the connector in an insertion direction, in which the connector is inserted in the housing space, and restricts movement of the connector in a removal direction opposite to the insertion direction, and the holder-side lock is formed so as to engage with the connector-side lock as a result of either one of the holder-side lock and the connector-side lock elastically deforming to be spaced away in a direction orthogonal to the insertion direction.

According to still another aspect of the present invention, in the protector, it is possible to configure that the main unit has a cover opening to be closed by a cover in a vertical direction orthogonal to a wiring direction in which the wiring members are wired, the housing space has a demolded opening, the demolded opening is contiguous with one end out of ends in the vertical direction of the insertion opening, the connector holder includes the holder-side lock disposed at a position facing the demolded opening in the vertical direction, the connector holder further includes a pair of ribs that protrude to an inside of the demolded opening from respective ends in a width direction orthogonal to the insertion direction and the vertical direction out of opening ends constituting the demolded opening, the ribs are spaced apart from each other in the width direction as viewed from the vertical direction, the holder-side lock is disposed between ends of the ribs as viewed from the vertical direction, and the ends of the ribs face each other.

According to still another aspect of the present invention, in the protector, it is possible to configure that the connector holder is disposed outside the main unit.

According to still another aspect of the present invention, in the protector, it is possible to configure that the insertion opening is disposed in a direction identical to a direction in which the wiring opening is disposed.

In order to achieve the above mentioned object, a wire harness according to still another aspect of the present invention includes a plurality of flexible wiring members; a connector electrically connected with an end of at least one wiring member out of the wiring members; and a protector that includes: a main unit inside which the wiring members are wired; and a connector holder that removably holds the connector exposed to an outside of the main unit from a wiring opening formed in the main unit, wherein the connector is to be fitted with a counterpart connector in a mutual relation, the connector holder has an insertion opening in which the connector is to be inserted from the outside and a housing space that houses and holds the connector, and the insertion opening is formed to be exposed to the outside of the main unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following details a protector and a wire harness according to an embodiment with reference to the accompanying drawings. It is noted that the embodiment is not intended to limit the scope of the invention. The elements of the embodiment include elements that are readily apparent to those skilled in the art, or elements that are substantially identical. Furthermore, various omissions, substitutions, and changes in the elements of the embodiment described herein may be made without departing from the spirit of the invention.

Embodiment

Figure 1:
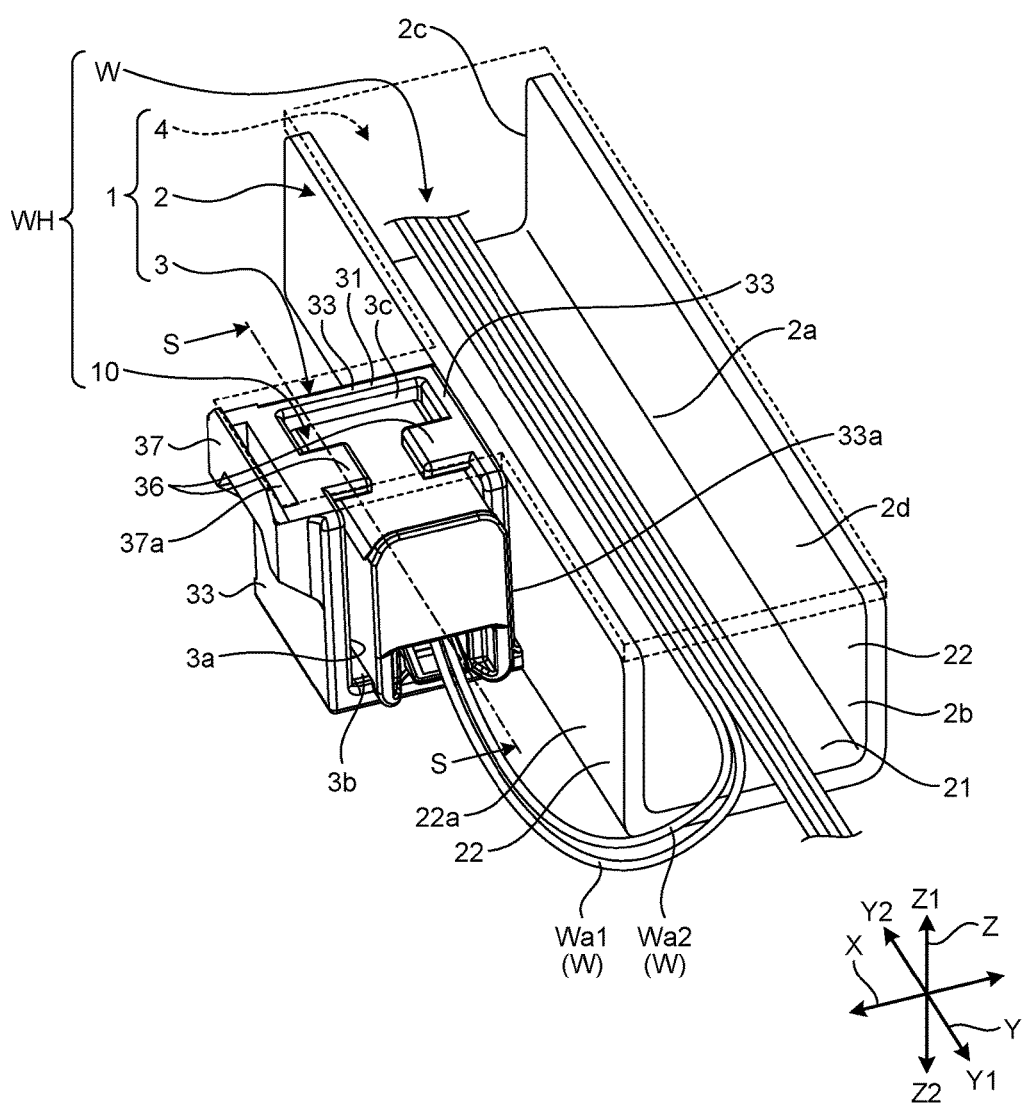
FIG. 1 is a perspective view of a protector and a wire harness according to an embodiment.
Figure 2:
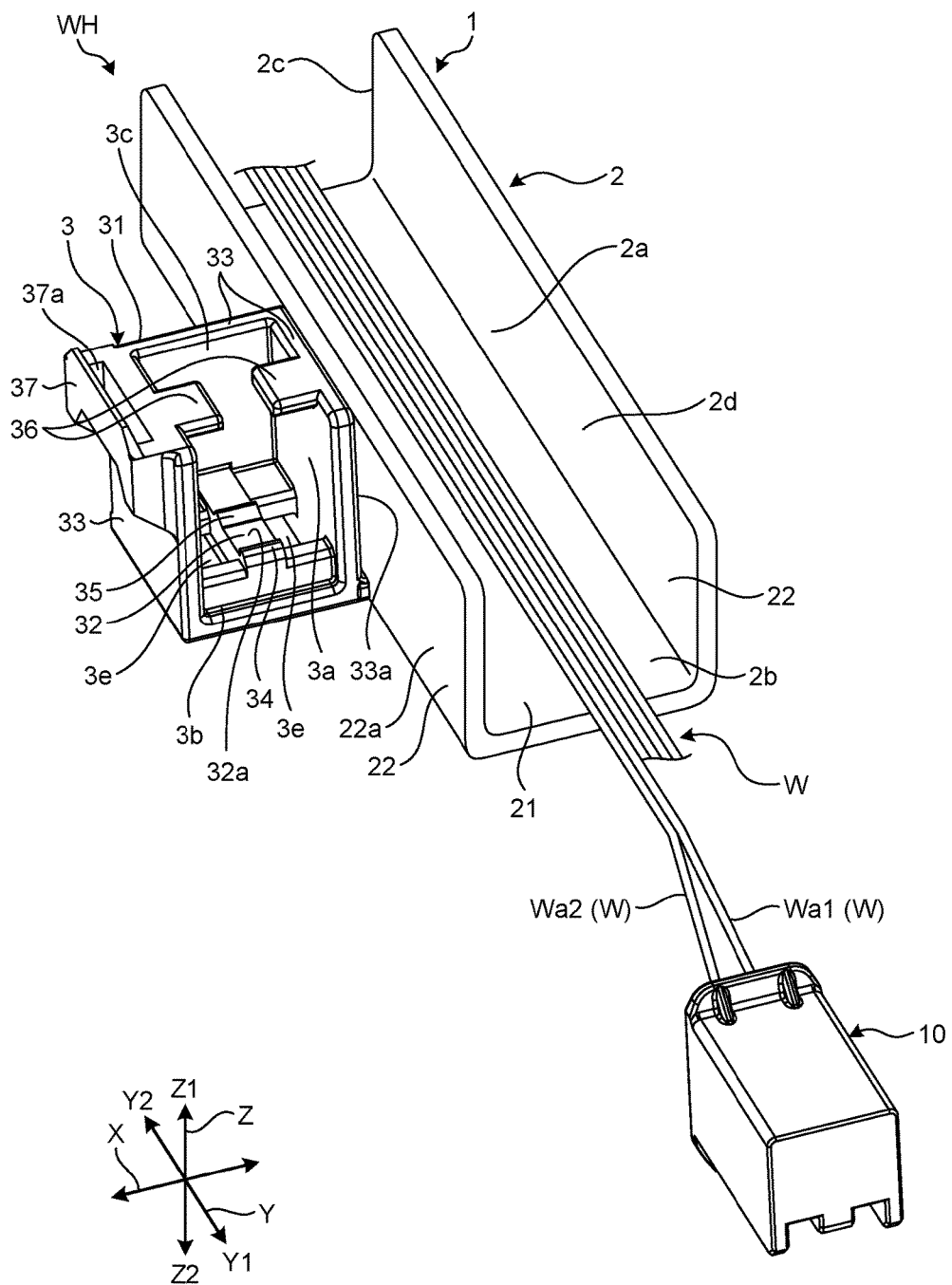
FIG. 2 is a perspective view of the protector and the wire harness according to the embodiment.
Figure 3:
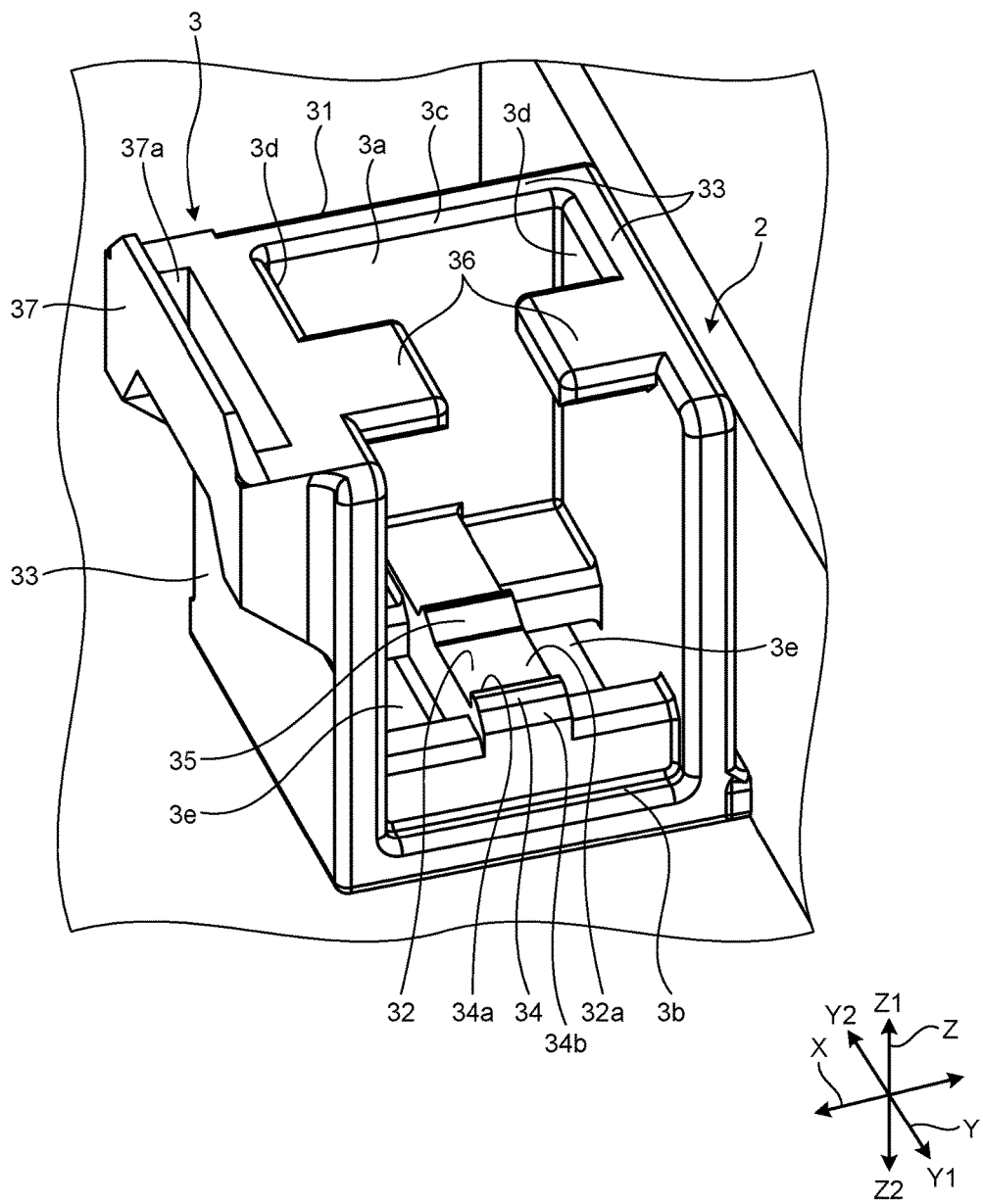
FIG. 3 is a partial enlarged view of the protector according to the embodiment.
Figure 4:
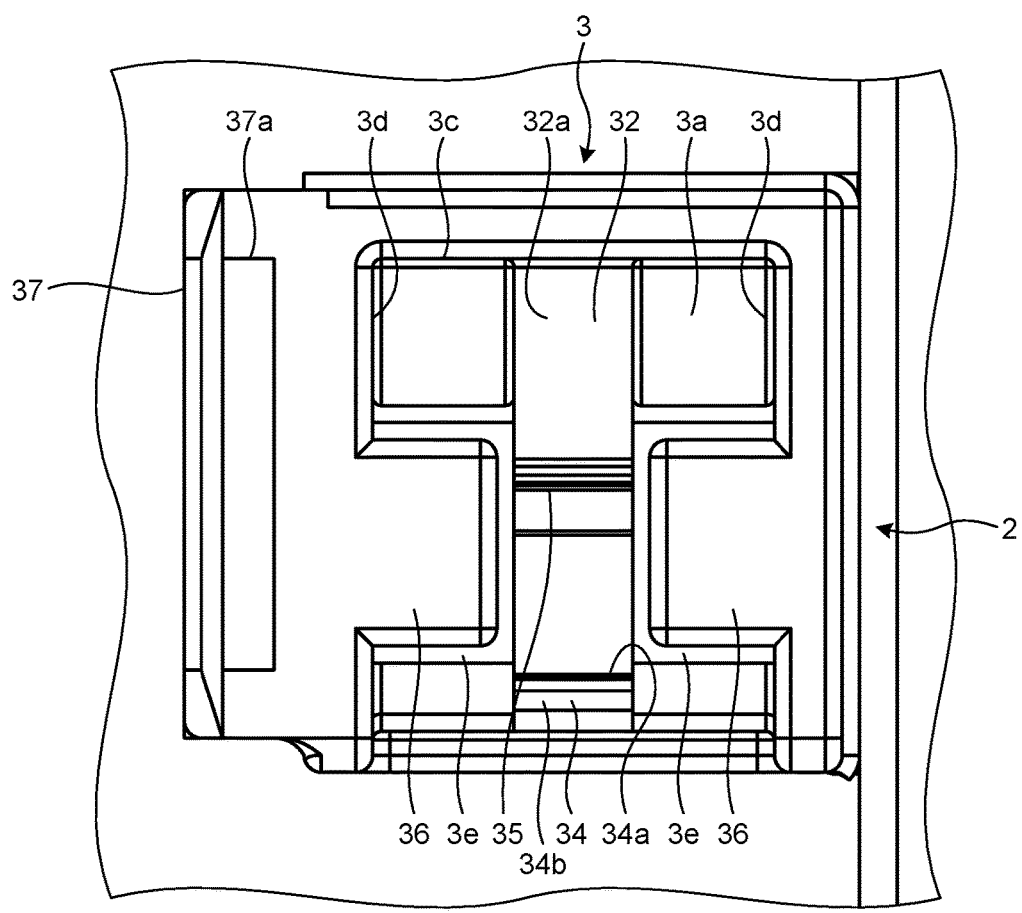
FIG. 4 is a partial enlarged view of the protector according to the embodiment.
Figure 4:
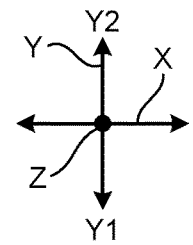
Figure 5:
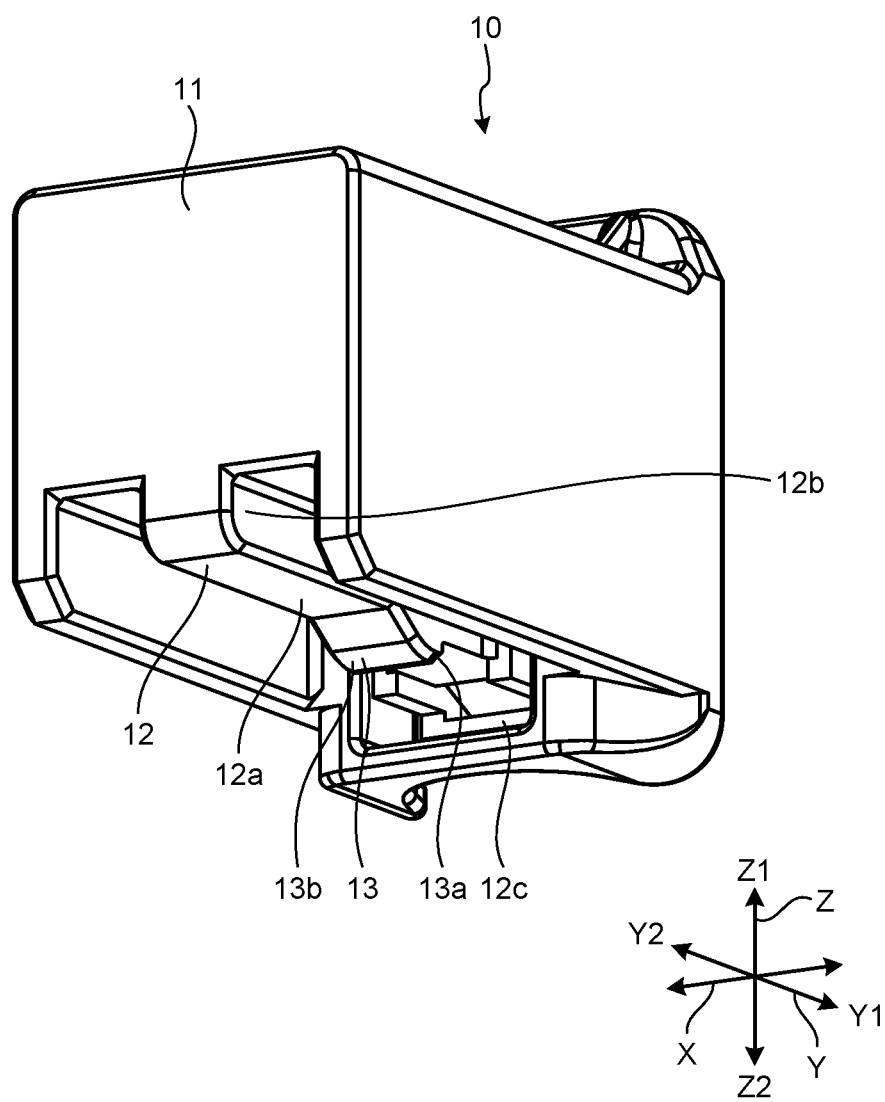
FIG. 5 is a partial perspective view of the wire harness according to the embodiment.
Figure 6:
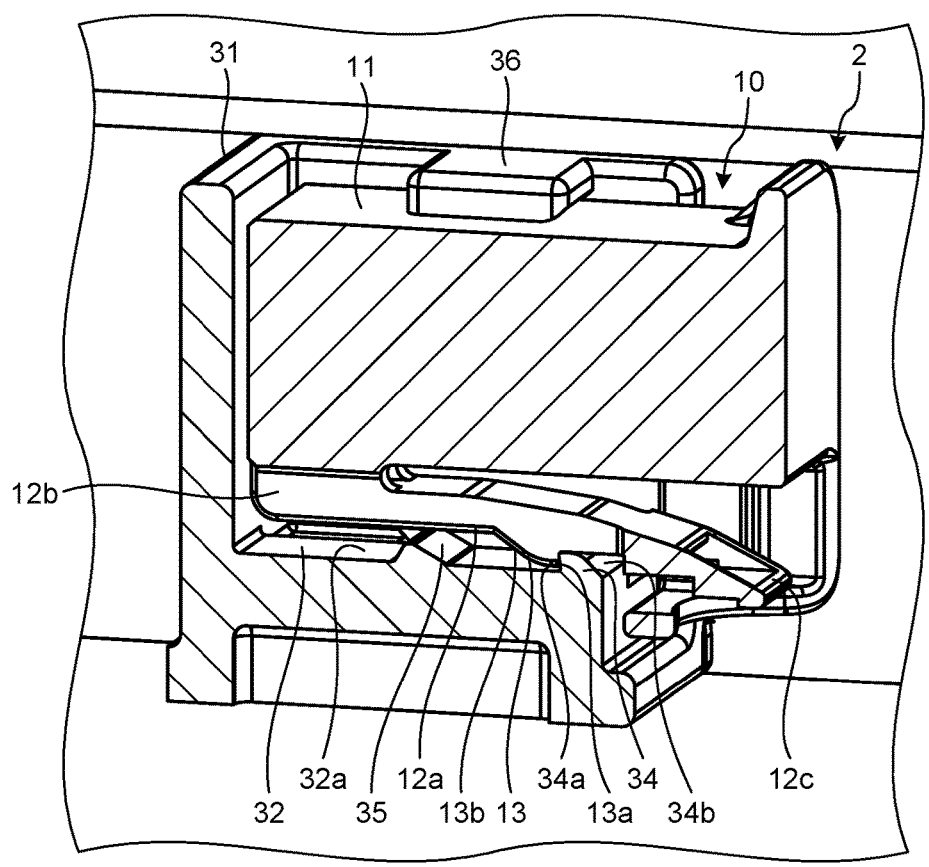
FIG. 6 is a cross-sectional view of the protector and the wire harness according to the embodiment.
Figure 6:
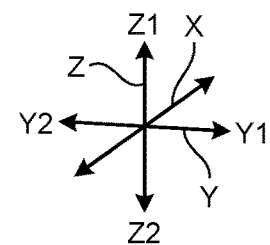

The following describes the protector and the wire harness according to the embodiment. FIG. 1 is a perspective view of the protector and the wire harness according to an embodiment. FIG. 2 is a perspective view of the protector and the wire harness according to the embodiment. FIG. 3 is a partial enlarged view of the protector according to the embodiment. FIG. 4 is a partial enlarged view of the protector according to the embodiment. FIG. 5 is a partial perspective view of the wire harness according to the embodiment. FIG. 6 is a cross-sectional view of the protector and the wire harness according to the embodiment. It is noted that FIG. 2 depicts a condition in which holding of the connector applicable to the wire harness is released from the protector illustrated in FIG. 1. FIG. 5 is a perspective view of the connector applicable to the wire harness illustrated in FIG. 1. FIG. 6 is a cross-sectional view of the protector and the wire harness in the embodiment, taken along line S-S in FIG. 1. It should further be noted that, in each of the drawings, the X-direction extends in a width direction of the protector in the embodiment. The Y-direction is a depth direction of the protector in the embodiment and is orthogonal to the X-direction. The Y-direction is a direction in which a wiring member applicable to the wire harness is wired, or a wiring direction. The Y-direction is also a direction in which the connector is to be inserted in, or removed from, the protector. The Y1-direction is a direction in which the connector is removed, or a connector removal direction, directed toward the front closer to the viewer of, for example, FIG. 1. The Y2-direction is a direction in which the connected is inserted, or a connector insertion direction, directed away from the viewer of, for example, FIG. 1. It should further be noted that, in each of the drawings, the Z-direction is a vertical direction of the protector in the embodiment and is orthogonal to the X-direction and the Y-direction. The Z1-direction is an upward direction and the Z2-direction is a downward direction.

A wire harness WH in the embodiment is mounted in a vehicle such as an automobile. A protector 1 to be incorporated in the wire harness WH mounted in the vehicle is disposed near a steering column. As illustrated in FIG. 1, the protector 1 protects a plurality of wires W constituting the wire harness WH. It is noted that the wires W are each a wiring member having electric conductivity and flexibility, electrically connecting an electronic device not illustrated and mounted in the vehicle with a switch not illustrated and disposed in a steering wheel. The protector 1 is formed of, for example, a synthetic resin having an insulation property. The protector 1 includes a main unit 2, a connector holder 3, and a cover 4.

As illustrated in FIGS. 1 and 2, the main unit 2 has the wires W wired in an inside 2a thereof. As viewed from the vertical direction and the width direction, the main unit 2 has an outline that is formed into a substantially rectangular shape having a long edge extending in the width direction. The main unit 2 is formed into a hollow shape defining a space in the inside 2a. The main unit 2 has a wiring opening 2b formed in an entire end on a front side out of two ends facing each other in the depth direction. The wiring opening 2b provides communication between the inside 2a and the outside of the main unit 2. Additionally, the main unit 2 has a facing opening 2c formed in an end on a rear side in the depth direction out of the two ends facing each other in the depth direction, specifically, at a position opposite to the wiring opening 2b in the depth direction. The facing opening 2c provides communication between the inside 2a and the outside of the main unit 2. The wiring opening 2b and the facing opening 2c are formed to have an identical shape and to communicate with each other through the inside 2a in the main unit 2. Thus, the wires W are passed in the inside 2a in the depth direction through the wiring opening 2b and the facing opening 2c to thereby be wired with respect to the main unit 2. The main unit 2 has a cover opening 2d formed in an end on the superior side. The cover opening 2d has a pair of ends in the depth direction. The two ends of the cover opening 2d connect to an end on the superior side of the wiring opening 2b and to an end on the superior side of the facing opening 2c, respectively. Specifically, the main unit 2 includes a flat plate-shaped bottom plate 21 having a long edge extending in the depth direction as viewed from the superior direction from which the wires W are loaded and a pair of lateral walls 22 that protrude superiorly from ends in the width direction of the bottom plate 21. The main unit 2 thereby forms a groove shape as viewed from the depth direction. Mounting the cover 4 on the main unit 2 causes the cover 4 to close the cover opening 2d and causes the inside 2a to be closed in the vertical direction.

Reference is made to FIGS. 1 to 4. The connector holder 3 removably holds a connector 10 to be described later. The connector 10 is exposed to the outside of the main unit 2. The connector holder 3 is disposed on the outside of the main unit 2 and is integrally formed with the main unit 2. The connector holder 3 is formed of a material identical to a material of the main unit 2. The connector holder 3 includes a holder main unit 31 and a housing space 3a.

The holder main unit 31 is formed into a substantially rectangular shape as viewed from the superior direction. The holder main unit 31 is formed into a hollow shape having the housing space 3a thereinside. The holder main unit 31 has four flat plate-shaped lateral walls. Each of the lateral walls is formed into a rectangular shape. The holder main unit 31 includes a bottom lateral wall 32 and three lateral walls 33. The bottom lateral wall 32 is disposed on a plane flush with the bottom plate 21 of the main unit 2. The lateral walls 33 are disposed on ends of the bottom lateral wall 32 and protrude superiorly. The lateral walls 33 include a pair of ends that extend in the depth direction and that face each other in the width direction and an end that extends in the width direction from a rear end in the depth direction. The holder main unit 31 is formed integrally with the main unit 2. Specifically, of the pair of lateral walls 33 facing in the width direction of the holder main unit 31, the lateral wall 33 facing the lateral wall 22 of the main unit 2 has an outer peripheral surface 33a facing and connecting with an outer peripheral surface 22a of the lateral wall 22. The holder main unit 31 is formed to have a length in the vertical direction identical to a length of the outer peripheral surface 22a in the vertical direction, specifically, a length of the main unit 2 in the vertical direction. The housing space 3a is formed in the holder main unit 31. The holder main unit 31 includes a holder-side lock 34, a protrusion 35, ribs 36, and a cover lock 37.

The housing space 3a represents a space in which the connector 10 is housed. The housing space 3a is formed to have a length in the width direction slightly greater than a length in the width direction of the connector 10. The housing space 3a has an insertion opening 3b and a demolded opening 3c. The insertion opening 3b represents an opening into which the connector 10 is to be inserted when the connector 10 exposed to the outside is to be housed in the housing space 3a. The insertion opening 3b is formed in an end on a front side, out of two ends facing each other in the depth direction of the housing space 3a, specifically, the holder main unit 31. Thus, the insertion opening 3b is formed in a direction identical to a direction in which the wiring opening 2b is formed in the main unit 2. The insertion opening 3b is formed so as to provide communication between the housing space 3a and the outside of the protector 1. Specifically, the insertion opening 3b is formed to be exposed to the outside. The demolded opening 3c serves as an opening for removing a mold for molding the connector holder 3 upon completion of injection molding to be performed for molding the connector holder 3. The demolded opening 3c is formed in an end on a superior side, out of two ends facing each other in the vertical direction of the housing space 3a, specifically, the holder main unit 31. Thus, the demolded opening 3c is formed in the direction identical to the direction in which the cover opening 2d is formed in the main unit 2. The demolded opening 3c is formed so as to provide communication between the housing space 3a and the outside. The demolded opening 3c is formed to have a length in the width direction identical to a length in the width direction of the insertion opening 3b and connects with an end on a superior side of the insertion opening 3b. The demolded opening 3c is closed by the cover 4 when the cover 4 is mounted on the connector holder 3. The closure closes a superior side of the housing space 3a.

The holder-side lock 34 is formed at a central portion in the width direction as viewed from the superior direction. The holder-side lock 34 is formed on an inner lateral surface 32a that is one of surfaces constituting the housing space 3a. The inner lateral surface 32a is formed, in the bottom lateral wall 32, on an end face on the superior side protruding superiorly over an entire width direction of the central portion in the width direction as viewed from the width direction and the superior direction. Under a condition in which the connector 10 is housed in the housing space 3a, the holder-side lock 34 faces a connector-side lock 13 to be described later in the insertion direction of the connector 10, specifically, the depth direction. The holder-side lock 34 restricts movement of the connector 10 with respect to the holder main unit 31 in the removal direction of the connector 10 opposite to the insertion direction. The holder-side lock 34 is formed, in the inner lateral surface 32a, on an end on the front side in the depth direction, specifically, on the side adjacent the insertion opening 3b. As illustrated in FIG. 6, the holder-side lock 34 has a holder-side lock surface 34a that protrudes from the inner lateral surface 32a to extend superiorly as viewed from the width direction. The holder-side lock surface 34a in the holder-side lock 34 abuts on a connector-side lock surface 13a of the connector-side lock 13 to be described later. The holder-side lock 34 has a holder-side inclined surface 34b on the end adjacent the insertion opening 3b. The holder-side inclined surface 34b protrudes from the inner lateral surface 32a, extends toward an end on the superior side of the holder-side lock surface 34a, and is inclined so as to connect with an end on the superior side of the holder-side lock surface 34a. When the connector 10 is inserted in, or removed from, the housing space 3a, the holder-side inclined surface 34b contacts a connector-side inclined surface 13b to be described later and smoothly guides the connector 10 in the insertion and removal directions. Because of the holder-side inclined surface 34b, the holder-side lock 34 is formed, as viewed from the width direction, to have a length in the depth direction decreasing in the depth direction from the inferior side toward the superior side.

The protrusion 35 is formed on the inner lateral surface 32a at a position in rear of the holder-side lock 34 in the depth direction. Under the condition in which the connector 10 is housed in the housing space 3a, the protrusion 35 restricts an inferior position of a connector main unit 11 of the connector 10 to be described later. The protrusion 35 is formed to have a length in the width direction identical to the length of the holder-side lock 34. The protrusion 35 is formed such that two surfaces rise from the inner lateral surface 32a, approach each other toward the superior side, and connect with each other at an end on the superior side. Specifically, the protrusion 35 is formed, as viewed from the width direction, into a triangular shape having a vertex angle disposed on the superior side.

The ribs 36 are formed in pairs in the holder main unit 31 to protrude from respective ends 3d out of opening ends constituting the demolded opening 3c. The ends 3d, formed in pairs, extend in the depth direction and face each other in the width direction. The ribs 36 are each formed into an identical shape. Under the condition in which the connector 10 is housed in the housing space 3a, the ribs 36 restrict movement of the connector 10 in the superior direction. The ribs 36 have end faces on the inferior side, and therefore under the condition in which the connector 10 is housed in the housing space 3a, the end faces on the inferior side are in contact with an end face on the superior side of the connector main unit 11. The ribs 36 are formed into a flat plate shape as viewed from the vertical direction and are spaced apart with respect to the holder-side lock 34 in the width direction. Specifically, the ribs 36 are spaced apart from each other in the width direction as viewed from the vertical direction and the holder-side lock 34 is disposed between ends of the ribs 36 facing each other.

The holder main unit 31 has a pair of openings 3e formed in the bottom lateral wall 32 on both ends in the width direction across the inner lateral surface 32a. The pair of openings 3e is formed to pass through the bottom lateral wall 32 in the vertical direction. The pair of openings 3e serves as an opening for removing a mold for molding the ribs 36 upon completion of injection molding to be performed for molding the holder main unit 31. Thus, the openings 3e are formed at positions to face the respective ribs 36 as viewed from the vertical direction.

The cover lock 37 is formed in the holder main unit 31 to protrude from an end of the holder main unit 31 opposite in the width direction to an end of the holder main unit 31 to be connected with the main unit 2 in a direction away in the width direction from the side of the main unit 2. The cover lock 37 has a superior-side end face flush with a superior-side end face of the holder main unit 31. The cover lock 37 has a lock tab insertion hole 37a formed to extend inferiorly from the superior-side end face. The lock tab insertion hole 37a is formed into a rectangular shape as viewed from the vertical direction so as to pass through the cover lock 37 in the vertical direction.

The cover 4 is a plate-shaped member formed along outlines of the main unit 2 and the connector holder 3, specifically, an outline of the protector 1. The cover 4 is mounted on the main unit 2 and the connector holder 3 to thereby close the cover opening 2d in the main unit 2 and the demolded opening 3c in the connector holder 3 altogether. The cover 4 is formed of a material identical to the material of the main unit 2 and the connector holder 3. The cover 4 has a lock tab that is not illustrated but is formed on a surface thereof facing the main unit 2 and the connector holder 3 when the cover 4 is mounted on the main unit 2 and the connector holder 3. The lock tab is inserted and locked in the lock tab insertion hole 37a when the cover 4 is mounted on the main unit 2 and the connector holder 3. Specifically, the cover 4 is locked in the main unit 2 and the connector holder 3 by the lock tab.

The connector 10 is one of the components to constitute the wire harness WH and is formed of a synthetic resin having an insulation property. As illustrated in FIGS. 1 and 2, the connector 10 are connected with, of the wires W, wires Wa1 and Wa2 that electrically connect an electronic device and a switch retrofitted on the vehicle. The connector 10 electrically connects the retrofitted electronic device with the wires Wa1 and Wa2. Under a condition in which the wires Wa1 and Wa2 are wired in the inside 2a of the protector 1 and the connector 10 is housed in the housing space 3a, the connector 10 is mounted on the front side, specifically, the end on the side adjacent the wiring opening 2b. The connector 10 is what is called a female connector having a terminal disposed inside a housing. The connector 10 receives a male connector as a counterpart connector connected with the electronic device and the male connector is fitted into the connector 10. The connector 10, when connected with the wires Wa1 and Wa2, is exposed to the outside of the main unit 2. The connector 10 includes the connector main unit 11 and a connector-side rib 12.

The connector main unit 11 is formed into a substantially rectangular shape as viewed from the vertical direction and the width direction. The connector main unit 11 is formed into a hollow shape housing thereinside the terminal to be electrically connected with a terminal of the counterpart male connector. As illustrated in FIGS. 5 and 6, in the connector main unit 11, among outer peripheral surfaces constituting the connector main unit 11, an outer peripheral surface on the inferior side is recessed toward the superior direction.

The connector-side rib 12 is formed such that, in the outer peripheral surface of the connector main unit 11 on the inferior side that is recessed toward the superior direction, a central portion in the width direction of the connector-side rib 12 protrudes toward the inferior side throughout an entire length in the depth direction as viewed from the width direction and the inferior direction. Under the condition in which the connector 10 is housed in the housing space 3a, an end face 12a on the inferior side of the connector-side rib 12 (specifically, an outer peripheral surface of the connector 10) faces the inner lateral surface 32a in the bottom lateral wall 32 of the holder main unit 31 in the vertical direction. The connector-side rib 12 is formed to be spaced away from an end face on the inferior side of the connector main unit 11. The connector-side rib 12 is formed into what is called a cantilever structure having an end on the rear side in the depth direction being a fixing end 12b connected with the end face on the inferior side of the connector main unit 11. Thus, the connector-side rib 12 has an end on the front side in the depth direction, specifically, an end opposite to the fixing end 12b in the depth direction, being a release end 12c. The release end 12c has a degree of freedom in deformation when given an external force, in accordance with a modulus of elastic deformation of the material forming the connector-side rib 12. Specifically, the release end 12c is elastically deformable in the vertical direction about the fixing end 12b by receiving an external force applied thereto in the vertical direction. The connector-side rib 12 is formed such that a superior-side end face of the connector-side rib 12 facing an inferior-side end face of the connector main unit 11 is spaced farther away from the inferior-side end face of the connector main unit 11 toward the release end 12c with respect to the fixing end 12b. The connector-side lock 13 is formed on the end face 12a on the inferior side of the connector-side rib 12.

Under a condition in which the counterpart male connector is inserted in the connector 10, the connector-side lock 13 faces a lock on the counterpart male connector in the insertion and removal directions to thereby restrict movement of the counterpart male connector with respect to the connector 10. Additionally, under the condition in which the connector 10 is housed in the housing space 3a, the connector-side lock 13 restricts movement of the holder-side lock 34 and of the connector 10 with respect to the holder main unit 31 in the removal direction of the connector 10. Under the condition in which the connector 10 is housed in the housing space 3a, the connector-side lock 13 faces the holder-side lock 34 in the insertion direction of the connector 10 and is disposed in rear of the holder-side lock 34. The connector-side lock 13 has the connector-side lock surface 13a that protrudes, as viewed from the width direction, from the end face 12a on the inferior side to thereby extend inferiorly. In the connector-side lock 13, the connector-side lock surface 13a abuts on the holder-side lock surface 34a. The connector-side lock 13 has a connector-side inclined surface 13b that protrudes from the end face 12a on the inferior side and is inclined so as to connect with an end on the inferior side of the connector-side lock surface 13a. The connector-side inclined surface 13b serves as a surface that, when the connector 10 is to be inserted in, or removed from, the housing space 3a in the connector holder 3, contacts the holder-side inclined surface 34b of the connector holder 3 and guides the connector 10 smoothly in the insertion and removal directions. As viewed from the width direction, the connector-side lock 13 has a length in the depth direction decreasing in the depth direction from the superior side to the inferior side because of the connector-side inclined surface 13*b*.

The following describes an exemplary assembly procedure of the protector 1 and the wire harness WH in the embodiment. An operator first wires the wires W in the depth direction in the inside 2*a* of the main unit 2. The operator next electrically connects the wires W with the electronic device and the switch. At this time, the operator attaches the connector 10 to ends exposed from the wiring opening 2*b* with respect to, out of the wires W, the wires Wa1 and Wa2 associated with the electronic device and the switch to be retrofitted. The operator then inserts the lock tab of the cover 4 in the lock tab insertion hole 37*a* in the holder main unit 31 to thereby lock the lock tab of the cover 4 in position, to thereby mount the cover 4 on the main unit 2 and the connector holder 3. This completes the assembly procedure.

The following describes, with reference to FIG. 6, an operation performed by the operator to house in the housing space 3*a* a connector in a state of not being connected with the counterpart connector, specifically, the connector 10 not in use. The operator, while holding the connector 10 exposed from the protector 1 such that the fixing end 12*b* faces anteriorly, inserts the connector 10 into the insertion opening 3*b*. The operator next continues moving the connector 10 in the housing space 3*a* in the depth direction, to thereby bring the holder-side inclined surface 34*b* of the holder-side lock 34 into abutment on the connector-side inclined surface 13*b* of the connector-side lock 13. The continued movement by the operator of the connector 10 in the depth direction causes a superior external force to be applied by the holder-side inclined surface 34*b* to the connector-side inclined surface 13*b*. The application of the superior external force causes the connector-side lock 13, specifically, the connector-side rib 12 to elastically deform superiorly. The superior elastic deformation of the connector-side rib 12 causes the connector-side lock 13 to be spaced away superiorly from the holder-side lock 34, so that the connector 10 continues to be inserted in the depth direction with respect to the housing space 3*a*. When the operator moves the connector 10 further in the depth direction, the connector-side lock 13 climbs over the holder-side lock 34 deeper in the depth direction. Then, the connector-side rib 12 deforms inferiorly because of a resilience involved therein. At this time, the connector 10 has, on the inferior side, the end face 12*a* on the inferior side of the connector-side rib 12 in contact with the end on the superior side of the holder-side lock 34. On the superior side, the connector 10 has the end face on the superior side in abutment on the pair of ribs 36 in the holder main unit 31. Specifically, the connector 10 is in a condition of being clamped in the holder main unit 31 in the vertical direction and is restricted from moving in the vertical direction. When the connector-side lock 13 climbs over the holder-side lock 34, the holder-side lock surface 34*a* abuts on the connector-side lock surface 13*a* and the connector-side lock 13 engages with the holder-side lock 34. The engagement restricts movement of the connector 10 in the removal direction with respect to the housing space 3*a*. After the connector-side lock 13 climbs over the holder-side lock 34, the load of a pressing force to insert the connector 10 decreases, so that the operator can perceive that the connector-side lock 13 has climbed over the holder-side lock 34. If the connector 10 abuts on the lateral wall 33 of the holder main unit 31 when the operator continuously moves the connector 10 in the depth direction and thus the connector 10 can no longer be moved in the depth direction, the operation to house the connector 10 in the housing space 3*a* is completed. Specifically, the connector 10 is in the condition of being housed in the housing space 3*a* and is held in the housing space 3*a*.

The following describes an operation to release the holding of the connector 10 with respect to the housing space 3*a* in order to connect the connector 10 with the counterpart male connector to establish an electric connection for the retrofitted electronic device and switch, specifically, to bring the connector 10 into use. To release the engagement between the connector-side lock 13 and the holder-side lock 34, the operator applies a superior external force to the release end 12*c* of the connector-side rib 12. The application of the superior external force causes the connector-side rib 12, specifically, the connector-side lock 13 to elastically deform in the superior direction, so that the connector-side lock surface 13*a* is spaced away in the vertical direction from the holder-side lock surface 34*a*. Thus, the connector-side lock 13 is spaced away in the vertical direction from the holder-side lock 34, so that the engagement between the connector-side lock 13 and the holder-side lock 34 is released. As a result, the restriction of movement of the connector 10 in the removal direction with respect to the housing space 3*a* is released. The operator, while applying the superior external force to the release end 12*c*, continuously moves the connector 10 in the removal direction to thereby allow the connector 10 to be removed from the housing space 3*a*. Specifically, the holding of the connector 10 with respect to the housing space 3*a* is released.

In the protector 1 according to the embodiment, the holder main unit 31 of the connector holder 3 includes the housing space 3*a* and has the insertion opening 3*b* that provides communication with the outside of the housing space 3*a* and the protector 1 holds the connector 10 exposed to the outside from the main unit 2 in the housing space 3*a* such that the connector 10 can be removed through the insertion opening 3*b*. In a configuration for integrally holding the connector 10 with the protector using adhesive tape, for example, the operator needs to wind the adhesive tape around the connector 10 and the protector to hold the connector 10 onto the protector and needs to remove the adhesive tape to release the holding. In contrast, the protector 1 enables the connector 10 to be integrally held with the protector 1 through the procedure of inserting the connector 10 in, or removing the connector 10 from, the housing space 3*a*. Thus, workability involved in holding the connector 10 and releasing the holding of the connector 10 with respect to the protector 1 can be improved.

Moreover, the configuration for integrally holding the connector 10 with the protector 1 using the adhesive tape unfortunately requires a space outside the protector 1, specifically, in a greater space on the vehicle side, for the operator to route the adhesive tape along the outer peripheries of the connector 10 and the protector 1 in order, for example, for the operator to wind the adhesive tape. In contrast, the protector 1 requires only a space for moving the connector 10 toward the insertion opening 3*b*, so that the space on the side of the vehicle in which the protector 1 is to be mounted can be reduced.

In the protector 1 in the embodiment, the insertion opening 3*b* is formed to be exposed to the outside of the main unit 2. Consider a configuration, for example, in which the insertion opening 3*b* is formed not to be exposed to the outside of the main unit 2, but to be exposed to the inside 2*a*. In this configuration, the operator needs to, for example, remove the cover 4 from the protector 1 to insert the connector 10 in the insertion opening 3*b*. In contrast, when the connector 10 is to be inserted in the insertion opening 3b, the protector 1 enables the operator to insert the connector 10 in the insertion opening 3b from the outside of the protector 1 without the need to remove the cover 4. This feature can improve workability involved in holding the connector 10 and releasing the holding of the connector 10 with respect to the protector 1.

In the protector 1 in the embodiment, the holder main unit 31 includes the holder-side lock 34 formed therein. The holder-side lock 34 is formed so as, under the condition in which the connector 10 is housed in the housing space 3a, to face the connector-side lock 13 in the insertion direction of the connector 10 and to restrict movement of the connector 10 in the removal direction from the housing space 3a through engagement with the connector-side lock 13 as a result of the connector-side lock 13 elastically deforming to be spaced away superiorly. The connector-side lock 13 is formed to engage with the counterpart connector when the connector 10 fits in the counterpart connector. Thus, with the protector 1, the connector 10 can be held in the connector holder 3 by the holder-side lock 34 and the connector-side lock 13 without the need to dispose a new lock mechanism between the holder main unit 31 and the connector 10.

In the protector 1 in the embodiment, the main unit 2 and the connector holder 3 have the cover opening 2d and the demolded opening 3c, respectively, formed in the same superior direction. Additionally, the demolded opening 3c is formed contiguous with the end on the superior side of the insertion opening 3b. Additionally, the holder main unit 31 includes the ribs 36 formed on the end of the demolded opening 3c and the holder-side lock 34 that protrudes superiorly and is formed on the inner lateral surface 32a of the bottom lateral wall 32 facing the demolded opening 3c in the vertical direction. Thus, the mold that molds the connector holder 3 and is removed from the demolded opening 3c upon completion of the molding can simultaneously mold the insertion opening 3b, the holder-side lock 34, and the ribs 36 in the connector holder 3. Furthermore, because the demolded opening 3c and the cover opening 2d are formed in the same direction, the connector holder 3 and the main unit 2 can be simultaneously molded with the same mold. Specifically, when the main unit 2 and the connector holder 3 are to be molded through injection molding, a mold operative in the vertical direction is used to mold the main unit 2 and the connector holder 3 in the protector 1 collectively and integrally including the holder-side lock 34 and the ribs 36. Thus, the number of molds can be reduced and the number of molding steps can be reduced, so that productivity can be enhanced.

Additionally, the protector 1 in the embodiment is formed such that the connector holder 3 is connected with the main unit 2 side-by-side across the lateral wall 33 and the lateral wall 22. For example, a configuration in which the connector holder 3 is formed in the inside 2a of the main unit 2 narrows the space for wiring the wires W. In contrast, in the protector 1, because the connector holder 3 is formed outside the main unit 2, an ample space is secured in the inside 2a for wiring the wires W.

In the protector 1 in the embodiment, the insertion opening 3b in the connector holder 3 and the wiring opening 2b in the main unit 2 are formed in the same direction. In a configuration in which the insertion opening 3b is formed on the side of the facing opening 2c of the main unit 2, for example, a space is required on the vehicle side for routing the connector 10 onto the side of the facing opening 2c when the operator performs a step of housing the connector 10 in the housing space 3a. In contrast, the protector 1 has the insertion opening 3b disposed on the side in which the connector 10 is exposed, so that the space can be eliminated from the vehicle side for routing the connector 10 toward the insertion opening 3b.

The wire harness WH described above includes the wires W, the connector 10, and the protector 1. Thus, when the connector 10 is to be housed and held in the housing space 3a, the step of inserting the connector 10 in the housing space 3a and the step of removing the connector 10 from the housing space 3a allow the connector 10 to be held integrally with the protector 1, so that workability involved in holding the connector 10 and releasing the holding of the connector 10 with respect to the protector 1 can be improved.

The wires W described in the embodiment as the wiring members W are illustrative only and not limiting. A flexible printed wiring board (FPC) may, for example, be used as the wiring member having electric conductivity and flexibility.

The arrangement, in which the connector-side lock 13 in the connector 10 elastically deforms to engage with the holder-side lock 34 in the wire harness WH, is illustrative only and not limiting. For example, the holder-side lock 34 may be configured to be elastically deformable or both the connector-side lock 13 and the holder-side lock 34 are configured to be elastically deformable.

In the protector and the wire harness according to the aspect of the present embodiment, the connector holder of the protector holds the connector exposed to the outside of the main unit in the housing space 3a removably through the insertion opening. Thus, the protector and the wire harness according to the aspect of the present invention can achieve an effect of being capable of improving workability involved in holding the connector and releasing the holding of the connector.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A protector comprising:
a main unit inside which a plurality of flexible wiring members are wired; and
a connector holder that removably holds a connector that is electrically connected with an end of at least one wiring member out of the wiring members and is exposed to an outside of the main unit from a wiring opening formed in the main unit, wherein
the connector includes a rear end face at which the end of the at least one wiring member is connected, and a front end face that is configured to be fitted into a counterpart connector in a mutual relation when the connector is disconnected from the connector holder,
the connector holder has:
a first wall that connects to and extends from the main unit;
a second wall that connects to and extends from the first wall, and the second wall is spaced away from and extends along the main unit;
an insertion opening in which the connector is to be inserted from the outside, the insertion opening extends from the second wall and toward the main unit, the insertion opening is spaced away from and opposes the first wall, and the insertion opening is formed to be exposed to the outside of the main unit; and a housing space that houses and holds the connector so that the front end face of the connector faces the first wall of the connector holder.

2. The protector according to claim 1, wherein the connector holder includes:
   a holder main unit in which the housing space is defined; and
   a holder-side lock formed on at least one inner lateral surface out of inner lateral surfaces constituting the housing space in the holder main unit,
   under a condition in which the connector is housed in the housing space, the holder-side lock faces a connector-side lock formed on an outer peripheral surface of the connector in an insertion direction, in which the connector is inserted in the housing space, and restricts movement of the connector in a removal direction opposite to the insertion direction, and
   the holder-side lock is formed so as to engage with the connector-side lock as a result of either one of the holder-side lock and the connector-side lock elastically deforming to be spaced away in a direction orthogonal to the insertion direction.

3. The protector according to claim 1, wherein the connector holder is disposed outside the main unit.

4. The protector according to claim 2, wherein the connector holder is disposed outside the main unit.

5. The protector according to claim 3, wherein the insertion opening is disposed in a direction identical to a direction in which the wiring opening is disposed.

6. The protector according to claim 4, wherein the insertion opening is disposed in a direction identical to a direction in which the wiring opening is disposed.

7. A protector comprising:
   a main unit inside which a plurality of flexible wiring members are wired; and
   a connector holder that removably holds a connector that is electrically connected with an end of at least one wiring member out of the wiring members and is exposed to an outside of the main unit from a wiring opening formed in the main unit, wherein
   the connector is to be fitted into a counterpart connector in a mutual relation,
   the connector holder has an insertion opening in which the connector is to be inserted from the outside and a housing space that houses and holds the connector, and
   the insertion opening is formed to be exposed to the outside of the main unit, wherein
   the connector holder includes:
      a holder main unit in which the housing space is defined; and
      a holder-side lock formed on at least one inner lateral surface out of inner lateral surfaces constituting the housing space in the holder main unit,
   under a condition in which the connector is housed in the housing space, the holder-side lock faces a connector-side lock formed on an outer peripheral surface of the connector in an insertion direction, in which the connector is inserted in the housing space, and restricts movement of the connector in a removal direction opposite to the insertion direction, and
   the holder-side lock is formed so as to engage with the connector-side lock as a result of either one of the holder-side lock and the connector-side lock elastically deforming to be spaced away in a direction orthogonal to the insertion direction,
   the main unit has a cover opening to be closed by a cover in a vertical direction orthogonal to a wiring direction in which the wiring members are wired,
   the housing space has a demolded opening,
   the demolded opening is contiguous with one end out of ends in the vertical direction of the insertion opening,
   the connector holder includes the holder-side lock disposed at a position facing the demolded opening in the vertical direction,
   the connector holder further includes a pair of ribs that protrude to an inside of the demolded opening from respective ends in a width direction orthogonal to the insertion direction and the vertical direction out of opening ends constituting the demolded opening,
   the ribs are spaced apart from each other in the width direction as viewed from the vertical direction,
   the holder-side lock is disposed between ends of the ribs as viewed from the vertical direction, and
   the ends of the ribs face each other.

8. The protector according to claim 7, wherein the connector holder is disposed outside the main unit.

9. The protector according to claim 8, wherein the insertion opening is disposed in a direction identical to a direction in which the wiring opening is disposed.

10. A wire harness comprising:
   a plurality of flexible wiring members;
   a connector electrically connected with an end of at least one wiring member out of the wiring members; and
   a protector that includes:
      a main unit inside which the wiring members are wired; and
      a connector holder that removably holds the connector exposed to an outside of the main unit from a wiring opening formed in the main unit, wherein
   the connector includes a rear end face at which the end of the at least one wiring member is connected, and a front end face that is configured to be fitted with a counterpart connector in a mutual relation when the connector is disconnected from the connector holder,
   the connector holder has:
      a first wall that connects to and extends from the main unit;
      a second wall that connects to and extends from the first wall, and the second wall is spaced away from and extends along the main unit;
      an insertion opening in which the connector is to be inserted from the outside, the insertion opening extends from the second wall and toward the main unit, and the insertion opening is spaced away from and opposes the first wall, and the insertion opening is formed to be exposed to the outside of the main unit; and
   a housing space that houses and holds the connector so that the front end face of the connector faces the first wall of the connector holder.

* * * * *